United States Patent [19]

Seifert

[11] Patent Number: 5,449,212

[45] Date of Patent: Sep. 12, 1995

[54] ELECTRICALLY-CONTROLLED TAILGATE OPERATOR

[76] Inventor: Lee S. Seifert, P.O. Box 772, Cut Bank, Mont. 59427

[21] Appl. No.: 187,651

[22] Filed: Jan. 28, 1994

[51] Int. Cl.$^6$ .............................. B62D 33/03
[52] U.S. Cl. ........................ 296/57.1; 296/106; 296/146.4; 74/89.15; 49/347; 49/357
[58] Field of Search ............... 296/56, 50, 57.1, 106, 296/146.4; 74/89.15; 49/324, 357, 347; 414/537

[56] References Cited

U.S. PATENT DOCUMENTS

| | | | |
|---|---|---|---|
| 1,380,229 | 5/1921 | Manheim | 49/324 |
| 1,977,284 | 10/1934 | Mathauer | 296/146.4 |
| 2,059,737 | 11/1936 | Mather | 296/57.1 X |
| 2,523,723 | 9/1950 | Santee et al. | 414/537 |
| 2,581,333 | 1/1952 | Vawter | 296/50 X |
| 2,727,781 | 12/1955 | D'Eath | 414/537 X |
| 2,893,727 | 7/1959 | Barnard | 296/56 X |
| 3,779,406 | 12/1973 | Hermann | 414/537 X |
| 4,041,645 | 8/1977 | Nourse | 49/347 |
| 4,475,761 | 10/1984 | Milroy et al. | 414/537 X |
| 4,616,444 | 10/1986 | Taylor | 49/347 |

FOREIGN PATENT DOCUMENTS

| | | |
|---|---|---|
| 969197 | 6/1975 | Canada . |
| 180125 | 7/1905 | Germany ............... 414/537 |
| 553394 | 6/1932 | Germany ............... 49/324 |
| 52-9222 | 1/1977 | Japan . |
| 7407939 | 7/1959 | Netherlands . |
| 496549 | 11/1938 | United Kingdom .......... 414/537 |

Primary Examiner—Dennis H. Pedder
Attorney, Agent, or Firm—Popham, Haik, Schnobrich & Kaufman, Ltd.

[57] ABSTRACT

An electrically-controlled tailgate operator for moving a vehicle tailgate between a generally vertical raised position and a generally horizontal lowered position. The tailgate operator includes a ball nut linear actuator received in a housing mounted longitudinally along the side of a vehicle. The actuator includes a rotatable, horizontally-extending externally-threaded worm screw, an internally-threaded ball nut in threaded engagement with the worm screw for linear movement relative to the worm screw, and a sheave attached to the ball nut and around which a flexible cable is routed. A motor is coupled to the worm screw. The flexible cable is attached at one end to the vehicle tailgate, and at its other end to the housing. When the motor is activated to rotate the worm screw in a first direction around its axis, the ball nut moves linearly toward the tailgate and the cable extends outwardly toward the tailgate, thereby moving the tailgate to a generally horizontal lowered position. When the motor is reversibly operated to rotate the worm screw in a second direction around its axis opposite the first direction, the ball nut is pulled back toward the front of the vehicle, thereby pulling the cable back toward the vehicle and moving the tailgate to a generally vertical raised position.

16 Claims, 3 Drawing Sheets

ELECTRICALLY-CONTROLLED TAILGATE OPERATOR

BACKGROUND OF THE INVENTION

1. Field of the Invention

The present invention relates to a tailgate operator. More specifically, the invention relates to an electrically-controlled operator for moving a vehicle tailgate between a generally vertical raised position and a generally horizontal lowered position.

2. Related Art

Mechanically and electrically controlled operators for opening vehicle doors are well known. U.S. Pat. No. 1,977,284 to Mathauer discloses a cable actuated door mechanism having an air compressor that provides compressed air to pneumatic cylinders having piston rods connected by flexible cables to doors.

U.S. Pat. No. 2,893,727 to Barnard discloses a power actuated closure including a motor that operates a threaded shaft that is threadedly engaged with an arm connected to a sheave. Operation of the motor causes the arm to be threaded along the shaft, thereby rotating the sheave. The tailgate is rigidly connected to the sheave through a leg, and is raised and lowered as the sheave is rotated by movement of the arm along the shaft. A flexible cable is anchored to the sheave and is wrapped onto the sheave as clockwise rotation of the sheave is initiated. As the cable is wrapped onto the sheave, the sheave pulls downwardly on the cable, thereby opening the tailgate.

U.S. Pat. No. 4,616,444 to Taylor discloses a radio-controlled gate opener having a reversible linear electrical actuator in the form of a screw jack, including an elongated rotary screw connected to an output shaft of a reversible motor pivotally mounted by a bracket and a pivot pin on an arm supported from a gate post. The rotary screw engages a nut pivotally carried on a wrung of the gate, so that rotation of the screw in opposite directions is effective to open and close the gate respectively.

Canadian Pat. No. 969,197 to Rogakos discloses a car tailgate having a bidirectional drive mechanism comprising a motor, a worm gear, and an output member with a pinion gear that meshes with a sector gear. The tailgate is raised and lowered by relative movement between a bracket on a support plate and the sector gear attached to a control arm. Operation of the motor rotates the worm gear, and the worm gear in turn rotates the output member, its pinion gear, and its sector gear, thereby raising or lowering the tailgate.

Netherlands Publication No. 7,407,939 discloses a balancer for a hinged loading gate. The loading gate is pivoted to a vehicle structure hat. A cable is secured at one end to the gate, runs over a pulley, and is connected to a tension spring.

Japanese Publication No. 52-9222 discloses a device for automatically controlling a tailgate of a container transporting vehicle. The tailgate is automatically unlocked as the container is tilted. A hook is rotated, thereby unlocking the tailgate by movement of a first rod connected through a crank, a second rod, and an arm to the container.

SUMMARY OF THE INVENTION

The present invention provides an electrically-controlled operator for moving a vehicle tailgate between a generally vertical raised position and a generally horizontal lowered position. The inventive tailgate operator is easily installed and allows a user to raise and lower the vehicle tailgate from inside the vehicle, without having to get out of the vehicle to manually operate the tailgate. Thus, the user is able to safely and easily raise and lower the tailgate, for example, when backing up to a loading dock or hooking up a fifth wheel style trailer, because the user does not have to get out of the vehicle and stand between the vehicle and the loading dock or trailer to raise and lower the tailgate. Additionally, the inventive tailgate operator allows locking of a tailgate on a pickup truck having a topper shell and tonneau cover.

According to a first embodiment of the invention, the electrically-controlled tailgate operator includes a ball nut linear actuator, a flexible cable, a motor, and a housing in which the actuator and motor are placed.

The ball nut linear actuator includes a rotatable, horizontally-extending externally-threaded shaft or worm screw having first and second ends and an internally-threaded block or ball nut in threaded engagement with the worm screw for linear movement relative to the screw. The cable is routed around a sheave attached to the ball nut.

The cable has a first end attached to the vehicle tailgate and a second end attached to the inside surface of the vehicle, and is routed around the sheave so that it is relatively taut. The tension maintained on the ball nut by the cable prevents the block from rotating relative to the worm screw.

The motor is coupled to the second end of the worm screw and in one aspect of the invention extends horizontally outwardly therefrom. This design is particularly useful with relatively light weight vehicles.

The actuator and motor are placed within the housing and the housing is then mounted longitudinally under a box lip of the vehicle so that the first end of the worm screw is located adjacent to the vehicle tailgate and the second end of the worm screw and the motor are located toward the front of the vehicle.

The motor can be operated by a double pole double or triple throw switch to activate the motor to rotate the worm screw of the actuator in a first direction around the axis of the worm screw. The ball nut accordingly moves linearly toward the first end of the worm screw, thereby extending the cable outwardly toward the tailgate and moving the tailgate to a generally horizontal lowered position. To raise the tailgate, the motor is reversibly driven to rotate the worm screw in a second direction around its axis opposite the first direction, so that the ball nut moves linearly toward the second end of the worm screw, thereby pulling the cable back toward the vehicle and moving the tailgate to a generally vertical raised position.

In a second embodiment, the motor is coupled to the second end of the worm screw so that the motor extends vertically downwardly from the worm screw and the housing and is located adjacent to the vehicle tailgate when the actuator is placed within the housing and the housing is mounted longitudinally under the vehicle box lip. This embodiment is particularly useful for relatively heavy vehicles. The tailgate is raised and lowered as described above, in relation to the first embodiment of the invention.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
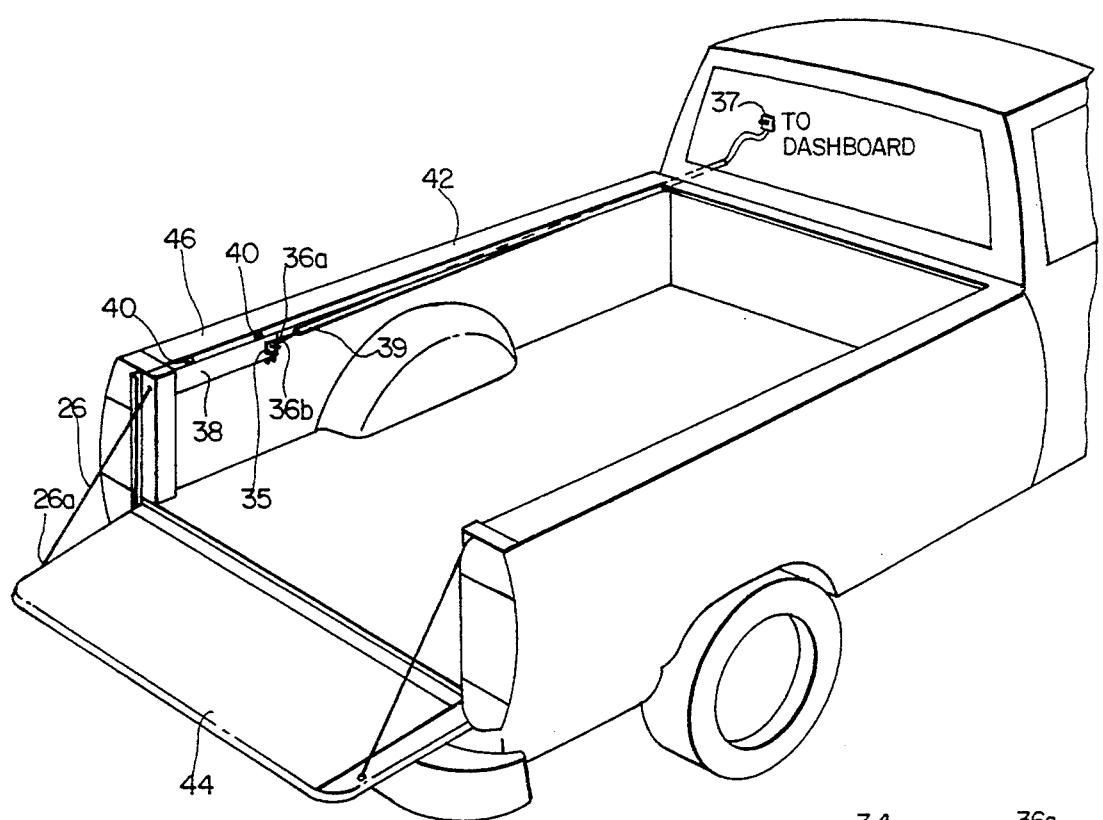
FIG. 1 illustrates a view of the installed tailgate operator according to the first embodiment of the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 2:
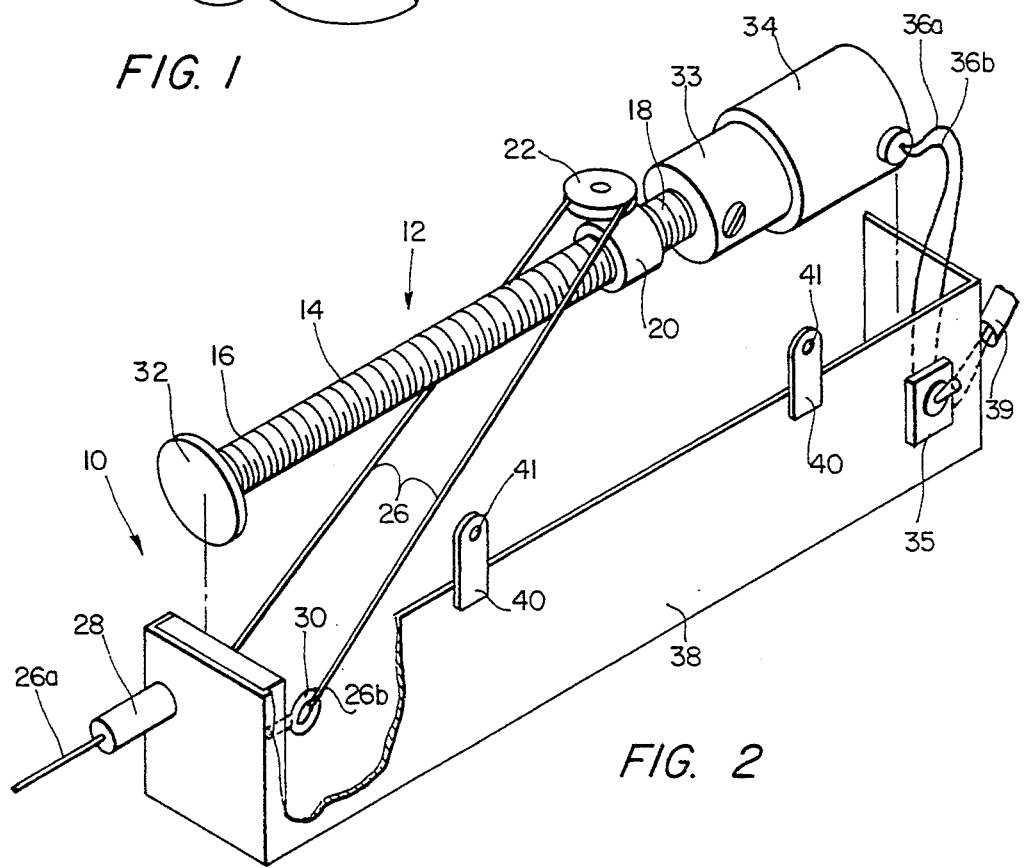
FIG. 2 illustrates a view of the tailgate operator according to the first embodiment of the invention.

As shown in FIGS. 1 and 2, the first embodiment of the tailgate operator 10 includes a ball screw linear actuator 12, a flexible cable 26 and a motor 34. Tailgate operator 10 fits inside a housing 38 that is easily mounted longitudinally under a truck box lip 46 of vehicle 42.

A linear actuator commercially available from Motion Systems, Inc. can be used in the operator 10 in accordance with the invention. Actuator 12 includes a rotatable horizontally extending externally-threaded shaft or worm screw 14 having a first end 16 and a second end 18 and an internally-threaded block or ball nut 20 in threaded engagement with and riding on worm screw 14. A sealed bearing 32 is mounted on first end 16 of actuator 12 and acts as a stop to prevent linear travel of ball nut 20 beyond first end 16. Sheave 22 is attached to and is positioned above ball nut 20 and receives cable 26.

Figure 4:
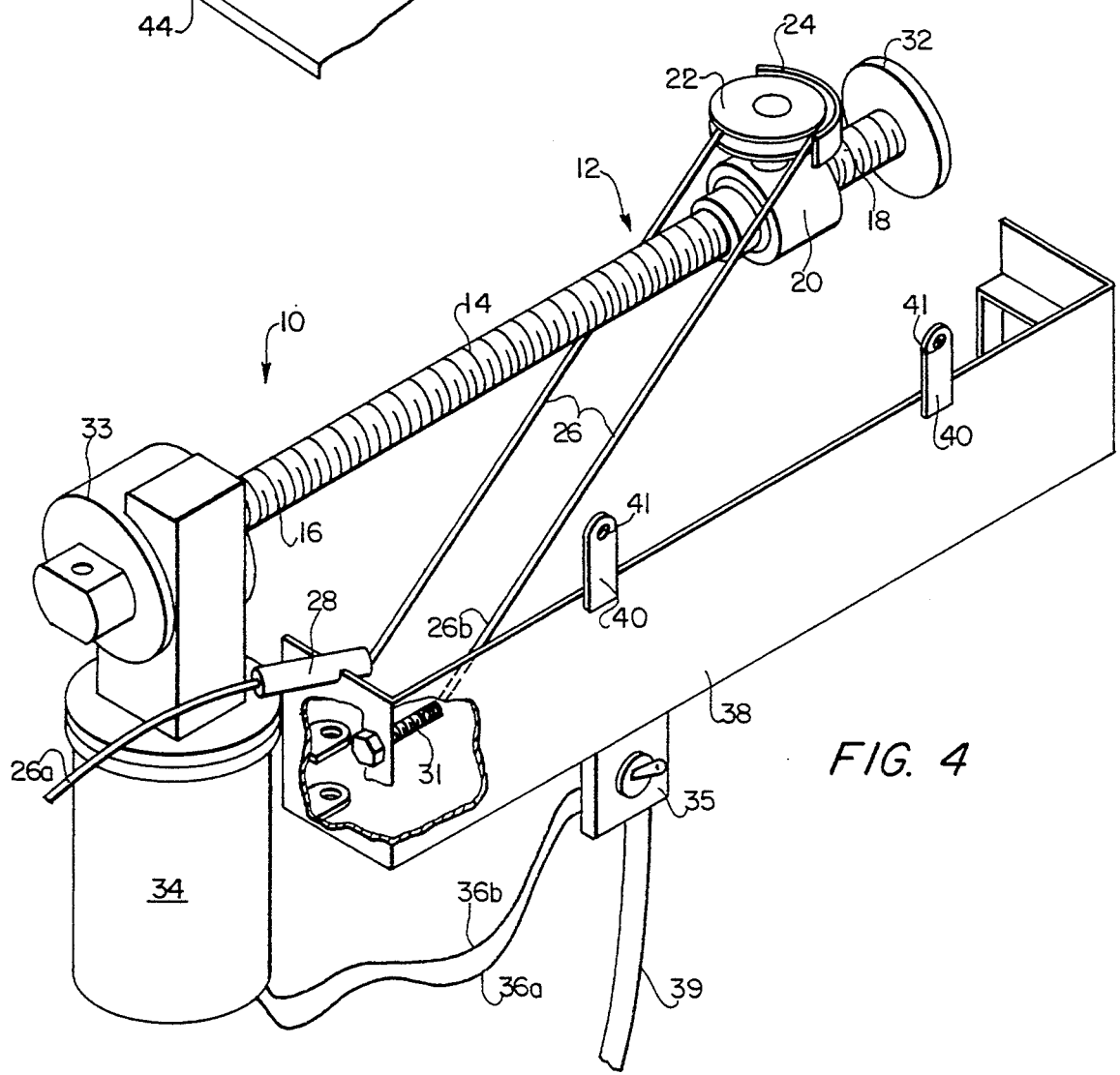
FIG. 4 illustrates a view of the tailgate operator according to the second embodiment of the invention.

Flexible cable 26 has a first end 26a attached to tailgate 44 and a second end 26b attached to an eyebolt 30 or similar fastener that is attached to housing 38. Cable 26 is routed around sheave 22 so that it remains taut during operation of tailgate operator 10, thereby preventing ball nut 20 from rotating with worm screw 14 during operation. Preferably, as shown in FIG. 4 in relation to the second embodiment of the invention, a guard 24 connected around a portion of the outer circumference of sheave 22 ensures that cable 26 remains in place around sheave 22.

Motor 34, preferably a 12 volt motor, is coupled to second end 18 of worm screw 14 at gear housing 33 and extends horizontally outwardly therefrom. Wires 36a, 36b extend outwardly from motor 34 and connect motor 34 to a double pole double throw switch 35 mounted on housing 38 for controlling tailgate operator 10.

A second double pole double throw switch 37 located on the dashboard of vehicle 42 also controls motor 34 so that tailgate 44 can be easily raised and lowered by operating either first switch 35 on housing 38 or second switch 37 on the vehicle dashboard.

Figure 5:
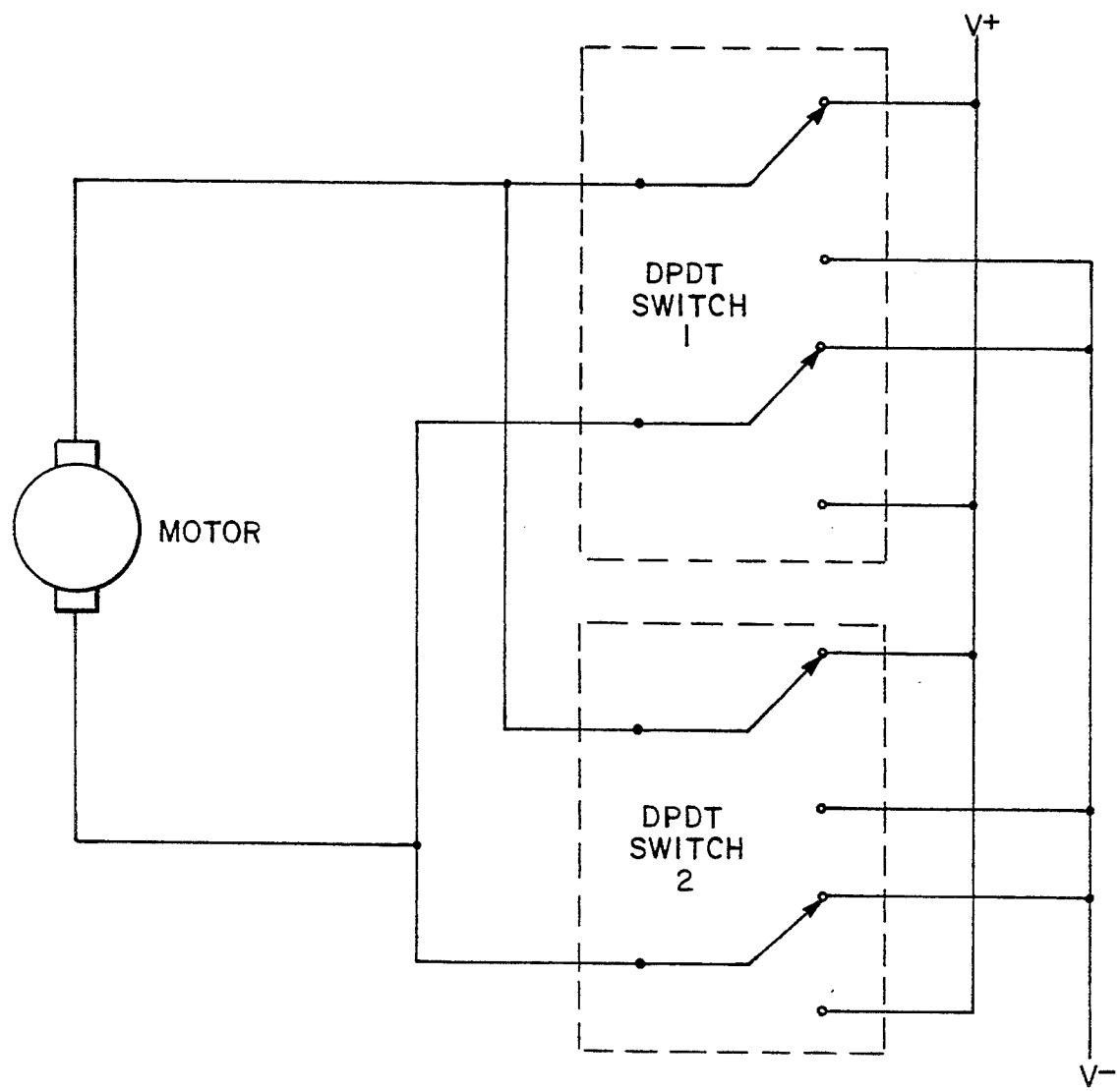
FIG. 5 is a circuit diagram.

Second switch 37 is electrically connected to motor 34 by an electrical cable 39 containing four wires, illustrated in the circuit diagram shown in FIG. 5. Either first switch 35 or second switch 37 can be positioned in a first position to drive motor 34 to turn worm screw 14 in a first direction about its axis, thereby moving tailgate 44 to a generally horizontal position. Either first switch 35 or second switch 37 can also be positioned in a second position to reversibly drive motor 34 to turn worm screw 14 in a second direction about its axis to move tailgate 44 to a raised position.

Double pole triple throw switches can be used in place of double pole double throw switches 35 and 37, in order to provide a neutral or "off" position, so that the tailgate can be locked at a position between the fully raised and fully lowered positions.

As shown in FIGS. 1 and 2, when installed, actuator 12 and motor 34 are placed in housing 38 and housing 38 is mounted longitudinally under box lip 46 of vehicle 42 so that first end 16 of worm screw 14 is adjacent to tailgate 44 and second end 18 of worm screw 14 and motor 34 are located toward the front of vehicle 42. Preferably, housing 38 is mounted under box lip 46 by inserting fasteners, such as screws (not shown) through holes 41 in brackets 40 on housing 38. First end 26a of cable 26 extends outwardly through housing 38 through a cable conduit 28, preferably a nylon-lined cable conduit, and is attached to tailgate 44. As shown in FIG. 2, second end 26b of cable 26 is attached to housing 38 by eye bolt 30 or a similar fastener.

When tailgate 44 is in a generally vertical raised position, ball nut 20 is located toward second end 18 of worm screw 14. During operation, motor 34 rotates worm screw 14 in the first direction around its axis to move ball nut 20 linearly toward first end 16 of worm screw 14. As ball nut 20 moves linearly toward first end 16 of worm screw 14, cable 26 is allowed to extend further outward through conduit 28, thereby moving tailgate 44 to a lowered position. Motor 34 can then be reversibly driven to rotate worm screw 14 in the second direction around its axis opposite the first direction to move ball nut 20 linearly toward second end 16 of worm screw 14, thereby pulling cable 26 back toward second end 18 of worm screw 14 and pulling tailgate 44 up to a generally vertical raised position. The tension placed on ball nut 20 by cable 26 prevents ball nut 20 from rotating relative to worm screw 14 during operation.

Actuator 12 preferably includes an automatic brake (not shown) located within gear housing 33 to hold tailgate 44 in any desired partially raised position or fully raised position, and to prevent tailgate 44 from vibrating open while in a raised or a partially raised position.

Figure 3:
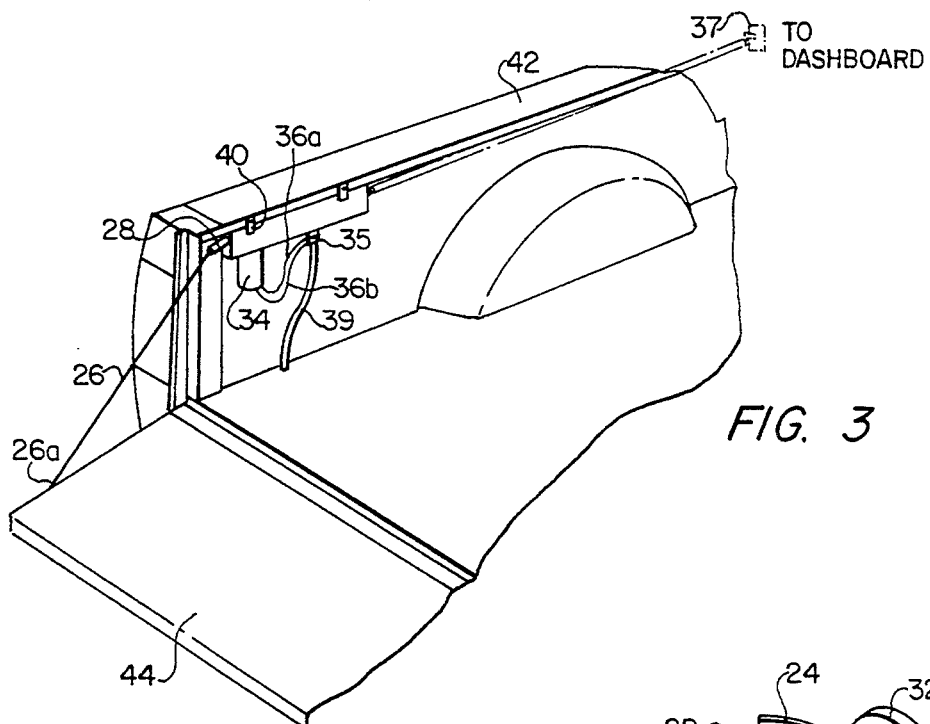
FIG. 3 illustrates a view of the installed tailgate operator according to the second embodiment of the invention.

According to the second embodiment of the invention, as shown in FIGS. 3 and 4, motor 34 is coupled to first end 16 of worm screw 14 of actuator 12 and extends vertically downwardly therefrom. This design is particularly useful with relatively heavy vehicles. In most respects other than the orientation of motor 34, the second embodiment is similar to the first embodiment. Sealed bearing 32 is mounted on second end 18 of worm screw 14 and acts as a stop to prevent linear travel of ball nut 20 beyond first end 16. Second end 26b of cable 26 is attached to housing 38 by an adjustable bolt 31 or a similar fastener.

When assembled, housing 38 is mounted longitudinally under truck box lip 46 of vehicle 42 so that motor 34 extends vertically downwardly from housing 38 and first end 16 of worm screw 14 and motor 34 are adjacent to tailgate 44 and second end 18 of worm screw 14 is located toward the front of vehicle 42, as shown in FIG. 3.

Operation of the second embodiment of the invention to move tailgate 44 between a generally vertical raised position and a generally horizontal lowered position is the same as described above, in relation to the first embodiment of the invention.

Modifications and variations of the above-described embodiments of the present invention are possible, as appreciated by those skilled in the art in light of the above teachings. For example, it is contemplated that the inventive tailgate operator can be used with any vehicle having a horizontally opening tailgate, such as a pickup truck or other four-wheel drive vehicle, or a station wagon, as housing 38 can be easily mounted longitudinally along the side of any such vehicle.

It is therefore to be understood that, within the scope of the appended claims and their equivalents, the invention may be practiced otherwise than as specifically described.

What is claimed is:

1. An electrically-controlled tailgate operator for moving a tailgate of a vehicle between a generally vertical raised position and a generally horizontal lowered position, comprising:
   a housing;
   a linear actuator enclosed within the housing, the actuator including a rotatable, horizontally-extending externally-threaded worm screw having first and second ends, and an internally-threaded ball nut in threaded engagement with the wormscrew, the ball nut having a sheave attached thereto;
   a flexible cable having a first end for attachment to the tailgate and a second end attached to the housing, the cable being routed around the sheave; and
   an electrical motor coupled to the second end of the worm screw for rotating the worm screw either in a first direction around its axis to move the ball nut linearly toward the first end of the worm screw, or in a second direction around its axis to move the ball nut linearly toward the second end of the worm screw.

2. The electrically-controlled tailgate operator of claim 1, wherein the motor extends horizontally from the second end of the worm screw.

3. The electrically-controlled tailgate operator of claim 1, wherein the motor extends vertically from the second end of the worm screw.

4. The electrically-controlled tailgate operator of claim 1, further comprising a nylon-lined cable conduit attached to the housing, the cable being routed through the conduit.

5. The electrically-controlled tailgate operator of claim 1, further comprising a guard partially surrounding the sheave, whereby the cable is held in place around the sheave.

6. The electrically-controlled tailgate operator of claim 1, further comprising a stop attached to the first end of the worm screw.

7. The electrically-controlled tailgate operator of claim 1, further comprising a control switch connected to the motor for activating the motor.

8. A vehicle comprising:
   a tailgate movable between a generally vertical raised position and a generally horizontal lowered position; and
   an operator for moving the tailgate between the raised and lowered positions, the operator including:
   a housing attached to the vehicle proximate the tailgate;
   an actuator enclosed within the housing, the actuator including a rotatable, horizontally-extending externally-threaded worm screw having a first end and a second end, and an internally-threaded ball nut in threaded engagement with the worm screw, the ball nut having a sheave attached thereto;
   a flexible cable having a first end attached to the tailgate and a second end attached to the housing, the cable being routed around tile sheave; and
   an electrical motor coupled to one of the first and second ends of the worm screw for rotating the worm screw either in a first direction around its axis to move the ball nut linearly toward the first end of the worm screw, thereby moving the tailgate to a lowered position, or in a second direction around its axis opposite the first direction to move the ball nut linearly toward the second of the worm screw, thereby moving the tailgate to a raised position.

9. The electrically-controlled tailgate operator of claim 8, wherein the motor extends horizontally from the second end of the worm screw.

10. The electrically-controlled tailgate operator of claim 8, wherein the motor extends vertically from the first end of the worm screw.

11. The electrically-controlled tailgate operator of claim 8, further comprising a nylon-lined cable conduit attached to the housing, the cable being routed through the conduit.

12. The electrically-controlled tailgate operator of claim 8, further comprising a fastener attaching the cable to the vehicle.

13. The electrically-controlled tailgate operator of claim 8, further comprising a guard partially surrounding the sheave, whereby the cable is held in place around the sheave.

14. The electrically-controlled tailgate operator of claim 8, further comprising a stop attached to the second end of the worm screw.

15. The electrically-controlled tailgate operator of claim 9, further comprising a first control switch positioned on the housing and connected to the motor for activating the motor.

16. The electrically-controlled tailgate operator of claim 15, further comprising a second control switch positioned on the vehicle dashboard and connected to the motor for activating the motor.

* * * * *